US012700690B1

(12) United States Patent
Strider et al.

(10) Patent No.: US 12,700,690 B1
(45) Date of Patent: Aug. 4, 2026

(54) SOCKET HAVING MULTIPLE CONTACT POINTS

(71) Applicant: AIRBORN, LLC, Georgetown, TX (US)

(72) Inventors: Ryan Strider, Georgetown, TX (US); Kevin Traugott, Georgetown, TX (US); Matt Gold, Little Falls, MN (US); William Rhea, Georgetown, TX (US)

(73) Assignee: AIRBORN, LLC

( * ) Notice: Subject to any disclaimer, the term of this patent is extended or adjusted under 35 U.S.C. 154(b) by 516 days.

(21) Appl. No.: 18/136,978

(22) Filed: Apr. 20, 2023

Related U.S. Application Data

(60) Provisional application No. 63/333,062, filed on Apr. 20, 2022.

(51) Int. Cl.

| | |
|---|---|
| ***H01R 13/11*** | (2006.01) |
| ***H01R 11/11*** | (2006.01) |
| ***H01R 12/57*** | (2011.01) |
| ***H01R 13/05*** | (2006.01) |

(52) U.S. Cl.
CPC ............ *H01R 13/111* (2013.01); *H01R 11/11* (2013.01); *H01R 12/57* (2013.01); *H01R 13/05* (2013.01)

(58) Field of Classification Search
CPC ....... H01R 13/111; H01R 13/05; H01R 11/11; H01R 12/57; H01R 11/22
USPC ................................ 439/751, 869, 870, 873
See application file for complete search history.

(56) References Cited

U.S. PATENT DOCUMENTS

| | | | | |
|---|---|---|---|---|
| 2,022,669 | A | 12/1935 | Keefe | |
| 3,167,373 | A | 1/1965 | Kostich | |
| 3,924,922 | A | 12/1975 | DeCenzo | |
| 4,090,772 | A | 5/1978 | Goodman | |
| 4,461,531 | A | 7/1984 | Davis et al. | |
| 4,934,967 | A * | 6/1990 | Marks .................. | H01R 13/111 439/856 |
| 4,986,769 | A | 1/1991 | Adams, III et al. | |

(Continued)

FOREIGN PATENT DOCUMENTS

| | | | |
|---|---|---|---|
| CN | 104882691 | B | 10/2017 |
| CN | 110492304 | A | 11/2019 |

(Continued)

*Primary Examiner* — Tulsidas C Patel
*Assistant Examiner* — Carlos E Lopez-Pagan
(74) *Attorney, Agent, or Firm* — Perilla Knox & Hildebrandt LLP; Usha Munukutla-Parker

(57) ABSTRACT

Electrical cable connector and method therefor employ a plurality of sockets, each socket having elongate contact members extending distally along a length of the socket, each contact member resiliently biased toward a central vertical axis of the socket. The contact members include first contact members and second contact members that have different fundamental frequencies from one another. The first contact members have a first lead engagement portion located at a first length along the socket, and the second contact members have a second lead engagement portion located at a second length along the socket. When a lead is inserted into the socket, the first and second contact members engage the connector lead at different times during the lead insertion process. This has the effect of lowering the peak insertion force required to insert the connector lead into the socket.

20 Claims, 8 Drawing Sheets

(56) References Cited

U.S. PATENT DOCUMENTS

| | | | | |
|---|---|---|---|---|
| 4,993,975 | A | 2/1991 | Asick et al. | |
| 5,051,100 | A | 9/1991 | Kato et al. | |
| 5,056,829 | A | 10/1991 | Kramer | |
| 5,071,375 | A | 12/1991 | Savage, Jr. | |
| 5,176,536 | A | 1/1993 | Ganger et al. | |
| 5,295,844 | A | 3/1994 | Koshikawa et al. | |
| 5,509,814 | A | 4/1996 | Mosquera | |
| 5,599,212 | A | 2/1997 | Sawada | |
| 5,620,347 | A | 4/1997 | Sawada | |
| 5,897,404 | A | 4/1999 | Goodman et al. | |
| 5,924,879 | A | 7/1999 | Kameyama | |
| 5,938,487 | A | 8/1999 | Henry et al. | |
| 6,188,583 | B1 | 2/2001 | Irendt | |
| 6,217,368 | B1 | 4/2001 | Baron | |
| 6,250,974 | B1 | 6/2001 | Kerek | |
| 6,299,482 | B1 | 10/2001 | Huang | |
| 6,394,858 | B1 * | 5/2002 | Geltsch | H01R 13/114 439/852 |
| 6,520,803 | B1 | 2/2003 | Dunn | |
| 7,048,597 | B2 * | 5/2006 | Chen | H01R 13/187 439/856 |
| 7,140,891 | B1 | 11/2006 | Huang et al. | |
| 7,223,108 | B2 | 5/2007 | Chiang et al. | |
| 7,234,966 | B2 | 6/2007 | Choy | |
| 7,347,741 | B1 | 3/2008 | Yeomans et al. | |
| 7,789,721 | B1 | 9/2010 | Burdenko et al. | |
| 8,210,860 | B2 | 7/2012 | Fukuda | |
| 8,465,304 | B2 | 6/2013 | Yen | |
| 8,465,332 | B2 | 6/2013 | Hogan et al. | |
| 8,540,525 | B2 | 9/2013 | Regnier | |
| 8,556,640 | B2 | 10/2013 | Mashiyama | |
| 8,651,881 | B2 | 2/2014 | Regnier | |
| 8,827,724 | B2 | 9/2014 | Takeuchi et al. | |
| 8,840,436 | B2 | 9/2014 | Mott et al. | |
| 8,876,562 | B2 | 11/2014 | Glick et al. | |
| 8,882,518 | B2 | 11/2014 | Li | |
| 8,992,237 | B2 | 3/2015 | Regnier | |
| 9,017,089 | B2 | 4/2015 | Flower et al. | |
| 9,325,095 | B2 | 4/2016 | Glick et al. | |
| 9,356,377 | B2 | 5/2016 | Mott et al. | |
| 9,368,930 | B2 | 6/2016 | Smith et al. | |
| 9,450,322 | B2 | 9/2016 | Ljubijankic | |
| 9,728,882 | B1 | 8/2017 | Nakazawa | |
| 9,806,449 | B2 | 10/2017 | Hachadorian | |
| 9,837,750 | B2 | 12/2017 | Wu et al. | |
| 9,899,750 | B1 | 2/2018 | Doiron et al. | |
| 9,917,390 | B1 | 3/2018 | Bianca et al. | |
| 9,954,292 | B2 | 4/2018 | Matsui et al. | |
| 9,966,686 | B2 | 5/2018 | Huang | |
| 9,979,111 | B2 | 5/2018 | Yoshioka et al. | |
| 9,999,127 | B2 | 6/2018 | Back et al. | |
| 10,128,624 | B2 * | 11/2018 | Tyler | H01R 13/62938 |
| 10,177,481 | B1 | 1/2019 | Hung et al. | |
| 10,243,296 | B2 | 3/2019 | Cheng | |
| 10,276,966 | B1 | 4/2019 | Hitchcock et al. | |
| 10,305,213 | B1 | 5/2019 | Hirakawa et al. | |
| 10,326,236 | B1 | 6/2019 | Harmelink et al. | |
| 10,374,347 | B2 | 8/2019 | Bianca et al. | |
| 10,411,381 | B2 | 9/2019 | Plested et al. | |
| 10,431,920 | B1 | 10/2019 | Tate | |
| 10,615,541 | B2 | 4/2020 | Morrison | |
| 10,622,742 | B2 | 4/2020 | Chen | |
| 10,651,587 | B2 | 5/2020 | Wu et al. | |
| 11,069,997 | B1 | 7/2021 | Taylor et al. | |
| 11,196,208 | B2 | 12/2021 | Cho et al. | |
| 2001/0027037 | A1 | 10/2001 | Kuo | |
| 2001/0049206 | A1 | 12/2001 | Johnescu | |
| 2004/0127091 | A1 | 7/2004 | Naito et al. | |
| 2009/0124136 | A1 | 5/2009 | Pepe et al. | |
| 2009/0305530 | A1 | 12/2009 | Ito et al. | |
| 2010/0093225 | A1 | 4/2010 | Wu | |
| 2010/0184330 | A1 | 7/2010 | Wu | |
| 2014/0308840 | A1 | 10/2014 | Kuo | |
| 2015/0118868 | A1 | 4/2015 | Choi et al. | |
| 2015/0217654 | A1 | 8/2015 | Woo et al. | |
| 2015/0311612 | A1 | 10/2015 | Qiao et al. | |
| 2018/0076583 | A1 | 3/2018 | Yi | |
| 2019/0067853 | A1 | 2/2019 | Ehrensvärd | |
| 2019/0267764 | A1 | 8/2019 | Wu et al. | |
| 2020/0028295 | A1 * | 1/2020 | Soubh | H01R 13/4223 |
| 2021/0119364 | A1 | 4/2021 | Hoffmann | |
| 2021/0143579 | A1 | 5/2021 | Moreau | |
| 2021/0194165 | A1 | 6/2021 | Hachadorian | |
| 2021/0328378 | A1 | 10/2021 | Yu et al. | |
| 2021/0376517 | A1 | 12/2021 | Bobelis et al. | |
| 2021/0399456 | A1 * | 12/2021 | Brand | H01R 13/111 |
| 2022/0247130 | A1 | 8/2022 | Kim et al. | |

FOREIGN PATENT DOCUMENTS

| | | | |
|---|---|---|---|
| DE | 102005003581 | A1 | 7/2006 |
| EP | 1137110 | A2 | 9/2001 |
| EP | 3945641 | A1 | 2/2022 |
| EP | 3945642 | A1 | 2/2022 |
| GB | 2485897 | B | 11/2011 |
| WO | 2017005953 | A2 | 1/2017 |
| WO | 2019077076 | A1 | 4/2019 |

* cited by examiner

SOCKET HAVING MULTIPLE CONTACT POINTS

CROSS-REFERENCE TO RELATED APPLICATIONS

This application claims the benefit of priority to and incorporates herein by reference U.S. Provisional Application No. 63/333,062, entitled "Improved Connectors for Electrical Cables," filed Apr. 20, 2022.

TECHNICAL FIELD

Embodiments of the present disclosure relate to improvements in the performance, reliability, and ease-of-use of connectors for electrical cables of the type used to transmit electrical signals in the radio frequency range, including twin-axial or "twinax" cable connectors, such as those used in various radio, cellular, and satellite communication systems, as well as various computers and electronic devices.

BACKGROUND

Electrical cable connectors are indispensable components in a variety of applications ranging from military, to industrial, to consumer electronics. As such, it is imperative that connectors be able to meet their designed performance and reliability specifications. This is especially true in military and aerospace applications where connectors are frequently exposed to harsh environmental and operating conditions involving mechanical vibrations and other physical stresses.

Mechanical vibrations in particular can be problematic in some electrical cable connectors. If the mechanical vibrations cause a connector or portion thereof to vibrate at its fundamental or natural frequency, the connector can experience intermittent loss of electrical contact that can manifest as signal noise or distortion. This is because even a small amount of vibration at the fundamental frequency, depending on the connector's size and shape, can induce a large physical response in the connector.

Therefore, while a number of advances have been made in the electrical cable contractor art over the years, improvements are continually needed.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

Embodiments of the present disclosure provide an improved connector for an electrical cable and method therefor. In some embodiments, the connector has a plurality of sockets, each socket having elongate contact members extending distally along a length of the socket, each contact member resiliently biased toward a central vertical axis of the socket. The contact members include first contact members and second contact members that have different fundamental frequencies from one another. The different fundamental frequencies may be achieved, for example, by designing the contact members to have different dimensions from one another. The first contact members have a first lead engagement portion located at a first length along the socket, and the second contact members have a second lead engagement portion located at a second length along the socket. When a lead is inserted into the socket, the first and second contact members engage the connector lead at different times during the insertion process. This has the effect of lowering the peak insertion force required to insert the connector lead into the socket.

In general, in one aspect, embodiments of the present disclosure relate to a socket for an electrical cable connector. The socket comprises, among other things, a generally cylindrical neck and at least one first contact member elongating distally from the neck along a length of the socket, the at least one first contact member resiliently biased toward a central vertical axis of the socket. The socket further comprises at least one second contact member elongating distally from the neck along the length of the socket and resiliently biased toward the central vertical axis, the at least one second contact member having a different length compared to the at least one first contact member. The socket is configured to receive a connector lead through the neck via a lead insertion process, and the first and second contact members engage the connector lead at different times during the lead insertion process.

In general, in another aspect, embodiments of the present disclosure relate to a connector for an electrical cable. The connector comprises, among other things, a generally rectangular connector base, a generally rectangular hood extending from the connector base. The connector further comprises a connector female portion disposed within the hood, the connector female portion having a plurality of socket passageways therein. A plurality of sockets are arranged within the socket passageways, each socket configured to receive a connector lead therein via a lead insertion process. Each socket is further configured to engage the connector lead at multiple times during the lead insertion process.

In general, in yet another aspect, embodiments of the present disclosure relate to a method of assembling a connector for an electrical cable. The method comprises, among other things, providing a generally rectangular connector base having a generally rectangular hood extending from the connector base. The method further comprises disposing a connector female portion within the hood, the connector female portion having a plurality of socket passageways therein. The method still further comprises arranging a plurality of sockets within the socket passageways, each socket configured to receive a connector lead therein via a lead insertion process. The socket is further configured to engage the connector lead at multiple times during the lead insertion process.

DETAILED DESCRIPTION

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As alluded to above, embodiments of the present disclosure relate to improved connectors for cables that are used to transmit electrical signals, particularly in the radio frequency and other high frequency ranges. Examples of such electrical cables include discrete cables, twinax cables, RF cables and other types of cables often found in radio, cellular, and satellite communication systems, computers and electronic devices, and similar applications. The connectors disclosed herein feature sockets that have an increased ability to withstand mechanical vibrations that otherwise often lead to intermittent loss of electrical contact while at the same time significantly reducing required peak insertion force compared to conventional sockets.

The improved sockets as described herein can be mounted on a printed circuit board (PCB) in some embodiments. Typically, a plurality of such sockets are disposed within a connector that houses and protects the sockets. The sockets and the connector are thereafter mounted on the PCB using conventional means, for example, by soldering. A second connector having a plurality of corresponding pins or leads can then be connected to the first connector. The second connector is typically attached to an electrical cable, but may likewise be mounted on a PCB in some embodiments. Establishing the connection involves lining up the two connectors such that each pin or lead therein is aligned with a corresponding socket, then inserting one connector into the other.

Figure 1B:
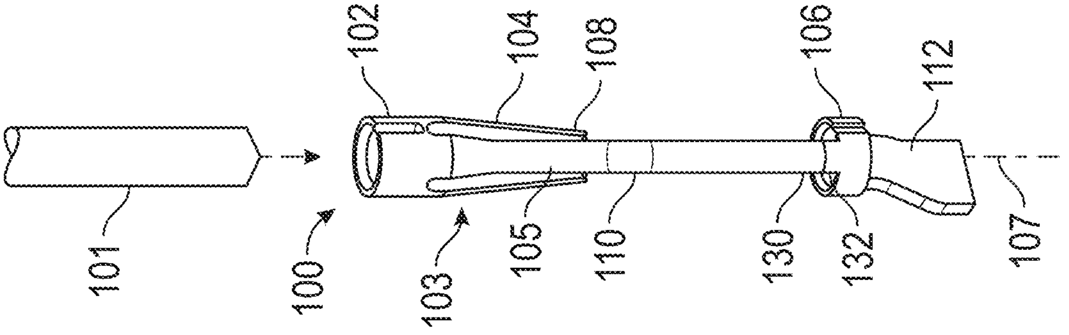
FIGS. 1A and 1B are perspective views showing an exemplary socket for an electrical cable connector according to embodiments of the present disclosure.
Figure 1A:
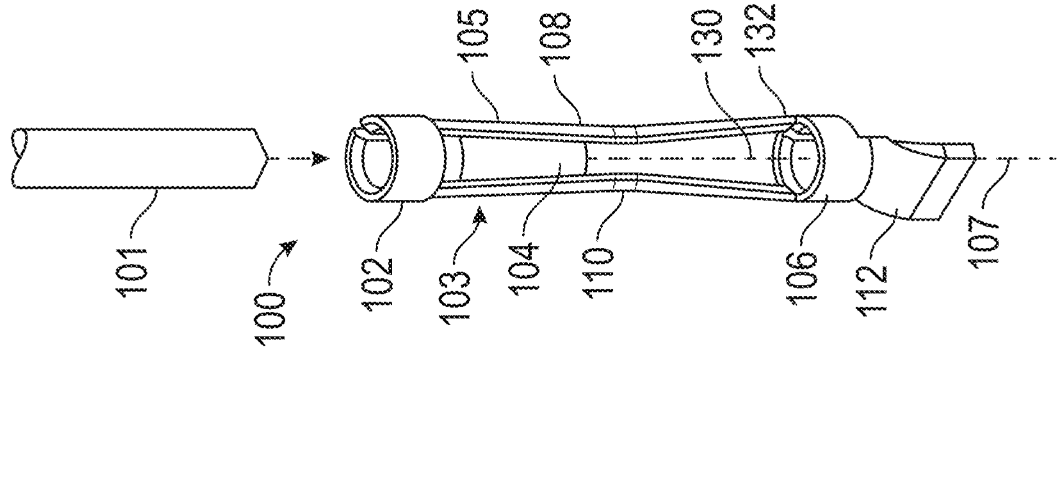

Referring now to FIGS. 1A and 1B, front and side perspective views of a socket 100 are shown for an electrical cable connector according to embodiments of the present disclosure. The socket 100 has a generally cylindrical neck portion 102 defining an opening through which a connector pin or lead 101 having a suitable diameter and cross section may be inserted. When thus inserted into the socket 100, the connector lead 101 is engaged by a plurality of opposing contact members 103 elongating from the neck portion 102 along a length of the socket 100. Each socket contact member 103 is tapered or angled radially inward by a predetermined angle so as to make contact with the connector lead 101 at a certain point in time during the lead insertion process and thereby establish a mechanical and electrical connection between the socket 100 and the connector lead 101.

In the embodiment shown, there are four contact members 103 equally spaced around the socket 100. In this embodiment, the contact members 103 are arranged in two pairs: a first pair composed of finger contact members 104 that oppose one another, and a second pair composed of support contact members 105 that oppose one another. The pair of opposing support contact members 105 extend along the socket 100 past the length of the opposing finger contact members 104 and join to a generally cylindrical base portion 106 near the bottom of the socket 100, as indicated at 130 and 132. The pair of opposing finger contact members 104, on the other hand, have free endings that do not join to any other structure.

As the figures show, the contact members 103 in each pair of contact members 104, 105 extend along the length of the socket 100 and are tapered or angled inward toward a central vertical axis 107 of the socket 100. This configuration gives the contact members 103 a resilient bias toward the central vertical axis 107, meaning they resist being deflected radially outward and tend to return to their original shape. To that end, the contact members 103 may be made of a malleable metallic material, such as copper or a copper alloy or other electrically conductive material that behaves like a spring when deflected less than the material's bending angle. In some embodiments, the entire socket 100, including each contact member 103, may be made from the same metallic material.

Each contact member 103 has an engagement point located near the portion where the contact member 103 is angled or tapered radially inward closest to the central vertical axis 107. An engagement for purposes herein refers to contact that is deliberate and designed, as opposed to unintentional or inadvertent contact. In an embodiment, the engagement points for the finger contact member 104 are located toward or near the endings thereof, as indicated at 108, while the engagement points for the support contact member 105 are located toward or near the midsection thereof, as indicated at 110. The finger contact engagement points 108 may be located above the support contact engagement points 110, as shown, but the reverse arrangement may also be used, depending on the application. From the engagement points 110, the support contact members 105 proceed to angle or taper radially outward away from the central axis 107 as they extend toward the base portion 106 at the bottom of the socket 100. The base portion 106, in turn, extends to a fan-shaped terminal extension 112 that then leads to a termination structure, discussed below.

Figure 2A:
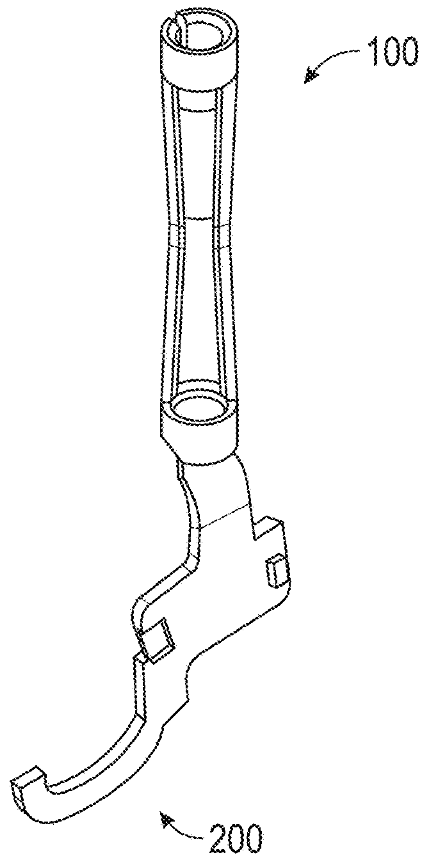
FIGS. 2A and 2B are perspective views showing an exemplary socket for an electrical cable connector having a J-style surface mount termination.
Figure 2B:
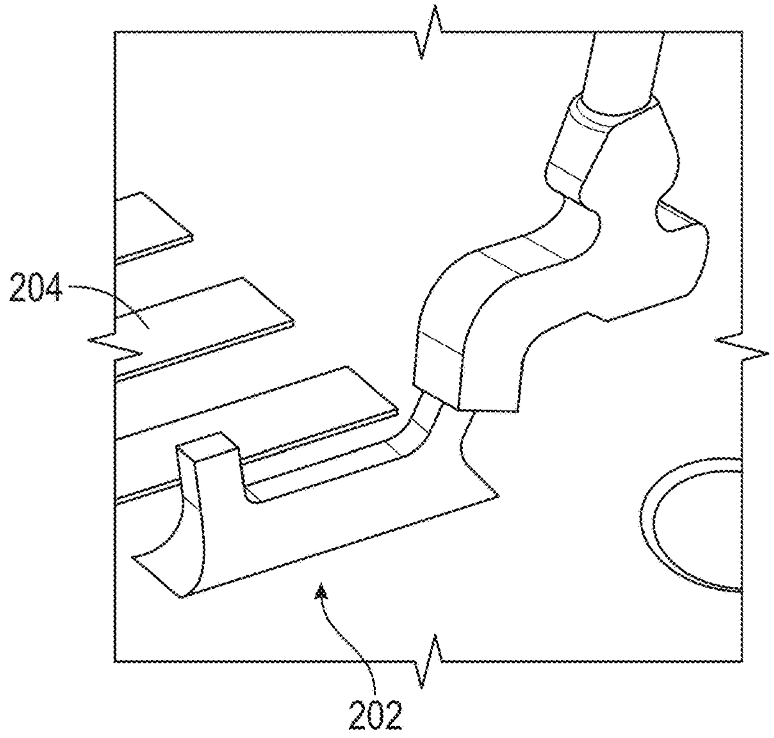

FIGS. 2A and 2B illustrate perspective views of an exemplary termination structure 200 that may be joined to the terminal extension 112 of the socket 100 in some embodiments. The exemplary termination structure 200 in this embodiment resembles a J-style surface mount termination of the type often seen on integrated circuits, but not electrical cable connectors. The J-style surface mount termination structure 200 may be attached to the terminal extension 112, or it may be formed as an integral extension of the terminal extension 112. Other types of surface mount termination structures, as well as through-hole termination structures and similar termination structures, may alternatively be provided on the socket 100. The J-style surface mount termination structure 200 (or other termination structures) may then be used to mount the socket 100 to a PCB 202 via, for example, a solder pad 204 on the circuit board.

In some embodiments, the socket 100 may be formed by cutting, stamping, punching, or the like, from a thin sheet or strip of the resilient malleable metallic material mentioned above. Dozens or hundreds of such sockets 100 may be manufactured from a long strip of such material by removing a pattern of material from the strip and rolling the remainder to produce the socket 100. Each such strip usually has one or more alignment holes that facilitate automated movement of the strip quickly and precisely through assembly equipment.

Figure 3:
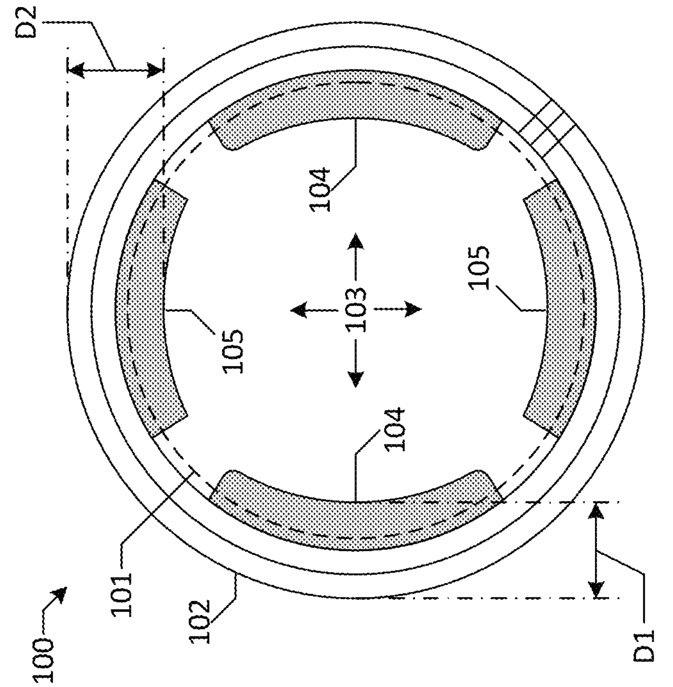
FIG. 3 is a plan view showing an exemplary socket for an electrical cable connector according to embodiments of the present disclosure.

FIG. 3 shows a top view of the socket 100 looking down into the neck portion 102, with the connector lead 101 shown in dashed lines for context. As can be seen, the inner diameter of the neck portion 102 is larger than the outer diameter of the connector lead 101 by a predefined amount. This predefined amount may be selected as needed for a particular connector application to allow sufficient room for the connector lead 101 to enter the neck portion 102. Each contact member 103 is angled or tapered radially inward such that the inward most portion of each contact member 103 extends inside the outer diameter of the connector lead 101, as shown. The distance that the inward most portion of the finger contact members 104 extends, indicated by D1, may be the same as or different from the distance that the inward most portion of the support contact members 105 extends, indicated by D2, depending on the particular connector application. In either case, these distances D1 and D2 should be selected to allow the contact members 103 to lightly (but securely) hold the connector lead 101 within the socket 100. For example, the distances D1 and D2 can be anywhere from about 0.08 to about 0.12 inches or more, such as approximately 0.010 inches. To this end, one or more of the contact members 103 may have a curved contour in some embodiments to maximize the contact surface area between the contact members 103 and the connector lead 101.

Figure 4:
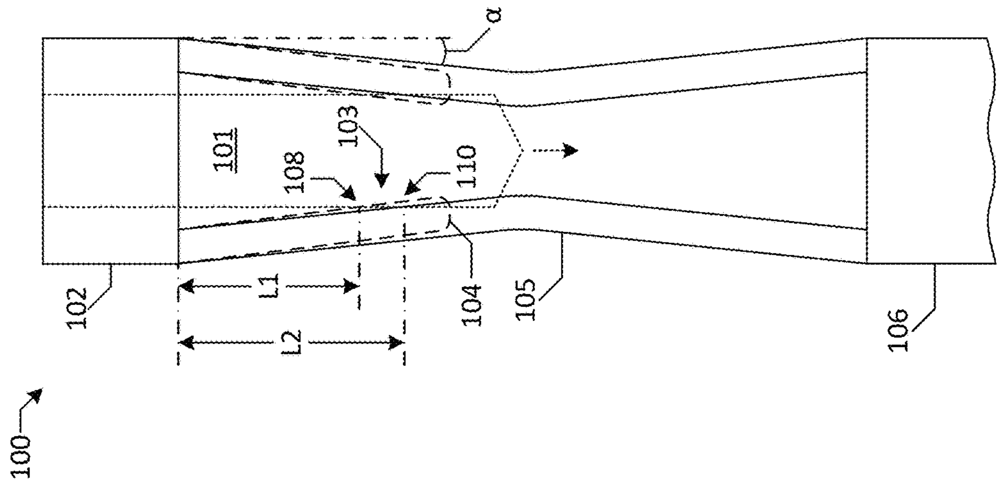
FIG. 4 is a side view showing an exemplary socket for an electrical cable connector according to embodiments of the present disclosure.

FIG. 4 illustrates a side view of the socket 100 with the finger contact members 104 superimposed (in dashed lines) over the support contact members 105 for comparison purposes. As the current view shows, the finger contact members 104 and the support contact members 105 are angled radially inward such that they engage the connector lead 101 at different times during the insertion process. In particular, the length along the socket 100 where the finger contact members 104 engage the connector lead 101, indicated by L1, is shorter by a predefined amount than the length along the socket 100 where the support contact members 105 engage the connector lead 101, indicated by L2. For example, L1 may be about 0.010 inches, while L2 may be greater than 0.010 inches, such as 0.015 inches. This means the connector lead 101 will reach the engagement points 108 on the finger contact members 104 before reaching the engagement points 110 on the support contact members 105 during the lead insertion process. Alternatively, L1 may be longer than L2 in some embodiments (e.g., L1=0.015 inches, L2=0.010 inches) depending on the particular connector application. The difference between lengths L1 and L2 may be selected as needed (e.g., 5 to 10 percent difference) for a particular connector application by choosing an appropriate angle α from the vertical for the support contact members 105 and likewise for the finger contact members 104. For example, angle α for the finger contact members 104 may be about 6° and angle α for the support contact members 105 may be about 3° in some embodiments.

A number of advantages arise from the engagement points 108 and 110 being located at different lengths L1 and L2 along the finger contact members 104 and the support contact members 105, respectively. For one thing, this arrangement has the effect of lowering the peak insertion force required to insert the connector lead 101 into the socket 100. More specifically, the peak insertion force required for the connector lead 101 to deflect the finger contact members 104 occurs before the peak insertion force required to deflect the support contact member 105 during the lead insertion process, since the finger contact members 104 engage the connector lead 101 before the support contact members 105 engage the connector lead 101. In other words, the total peak insertion force required to insert the connector lead 101 into the socket 100 is spread over a longer period of time, resulting in a lower maximum force overall.

Figure 5:
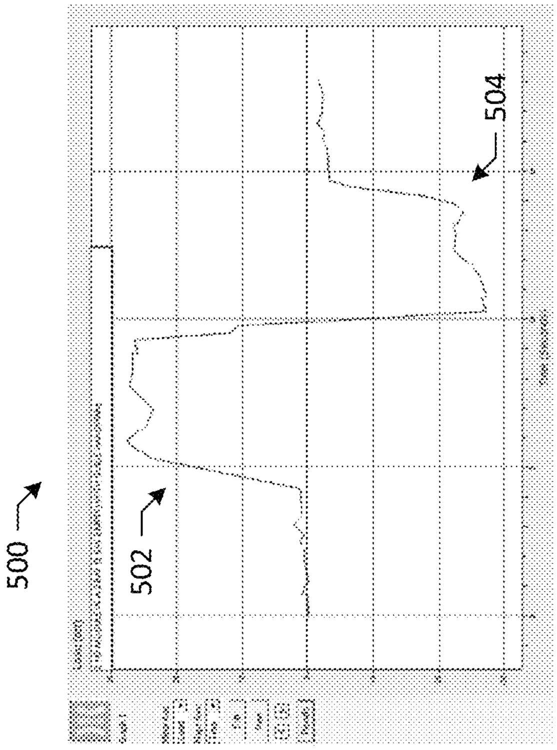
FIG. 5 is a graph showing insertion force on an exemplary socket for an electrical cable connector according to embodiments of the present disclosure.

FIG. 5 depicts a graph 500 that conceptually illustrates the above reduction in insertion force. In the graph 500, the vertical axis represents the force or load exerted on the contact member 103 during the lead insertion process and the horizontal axis represents time. In general, the force required for a connector lead to deflect a contact member is typically higher compared to the force required for the connector lead to slide along the contact member, since the latter is mostly friction force. As can be seen in the graph 500, the insertion forces required to deflect the finger contact members 104, indicated at 502, is offset in time from the force required to deflect the support contact members 105, indicated at 504. This offset effectively allocates the total insertion force required over a longer period of time, thus reducing the amount of peak force required.

An additional advantage of the socket 100 arises from the finger contact members 104 and the support contact members 105 having different dimensions (e.g., lengths, widths, and/or thickness) from one another. As alluded to above, a structure's fundamental frequency depends on the structure's size and shape, and even a small amount of vibration at that fundamental frequency can induce a large physical response in the structure. For electrical cable connectors, such vibrations can cause the connector to suffer intermittent loss of electrical contact that can manifest as signal noise or distortion. But because the finger contact members 104 and the support contact members 105 have different dimensions from one another, they have different fundamental frequencies. The different fundamental frequencies render the socket 100 less susceptible to electrical interruptions due to mechanical vibrations, as mechanical vibrations at the fundamental frequency of the finger contact members 104 will have less effect on the support contact members 105, and vice versa.

In an embodiment, the socket 100 may have more than four contact members 103. In such embodiment, one or more of the additional contact members 103 (those in excess of four) may engage the connector lead 101 at the same time as one of the other contact members 103 during the lead insertion process. Alternatively, one or more of the additional contact members 103 may engage the connector lead 101 at a different time from any of the other contact members 103 during the insertion process.

Figure 6:
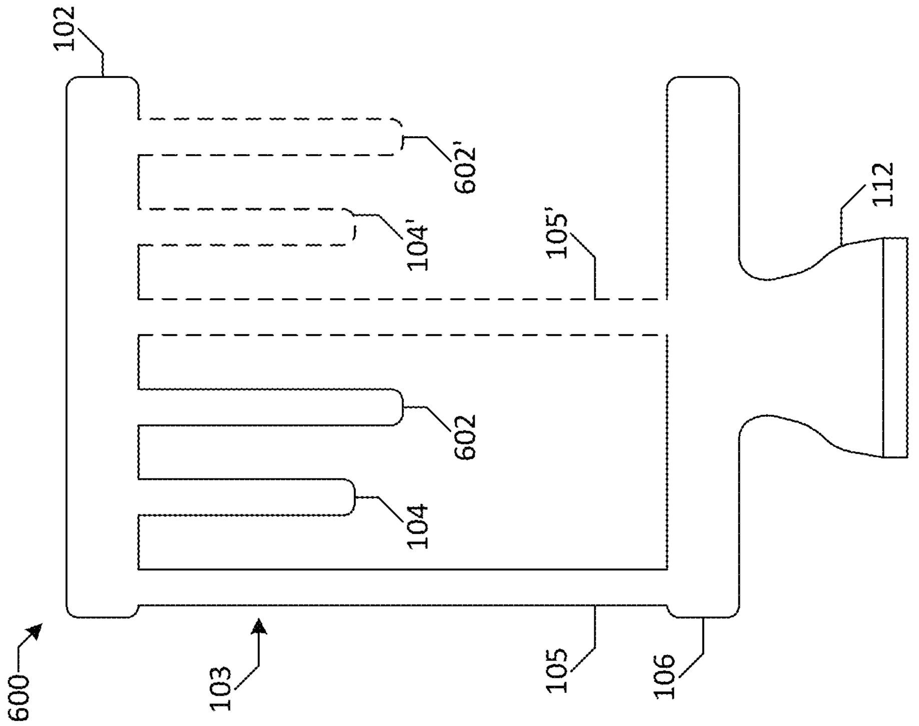
FIG. 6 is a flattened view showing a socket having additional contact members according to embodiments of the present disclosure.

FIG. 6 illustrates a flattened view of a socket 600 having additional (optional) contact members according to some embodiments. As can be seen, the exemplary socket 600 is similar to the socket 100 in FIG. 1 except that there is at least one additional contact member 103. As can be seen, the socket 600 has a neck portion 102, a set of contact members 103, a base portion 106, and a terminal extension 112. The set of contact members 103 includes at least one finger contact member 104, at least one support contact member 105, and at least one additional contact member 602. As the figure shows, however, the set of contact members 103 may include another finger contact member 104', another support contact member 105', and/or another additional contact member 602' in some embodiments, drawn in dashed lines. It will be understood that the dimensions (i.e., length, width, and/or thickness) of the contact members 103 depicted here are illustrative only.

In the example of FIG. 6, the additional contact members 602, 602' may resemble a finger contact member 104, 104' or a support contact member 105, 105'. Alternatively, the additional contact members 602, 602' or may have a longer or shorter length than the finger contact member 104, 104' as well as a longer or shorter length than each other. Thus, the additional contact members 602, 602' may engage the connector lead 101 at different times from the finger contact members 104, 104' as well as from each other, during the lead insertion process. It will of course be understood that the dimensions (i.e., length, width, and/or thickness) of the contact members 103 depicted here are illustrative only. Thus, for embodiments where there are two, three, four, five, six, or more contact members 103, the width of the individual contact members 103 may be narrower or wider as needed for spacing around the neck 102.

In FIG. 6 (and other figures herein), each finger contact member 104 or 104' support contact member 105 or 105' and additional contact member 602 or 602' is resiliently biased toward a central vertical axis 107 (FIG. 1). In addition, each finger contact member 104 or 104', support contact member 105 or 105', and additional contact member 602 or 602' is arranged opposite to another finger contact member 104 or 104', support contact member 105 or 105', or additional contact member 602 or 602', respectively, on the socket 600. However, those having ordinary skill in the art will understand that each finger contact member 104 or 104', support contact member 105 or 105', and additional contact member 602 or 602' may instead be arranged adjacent to another finger contact member 104 or 104', support contact member 105 or 105', or additional contact member 602 or 602', respectively, on the socket 600.

Figure 7:
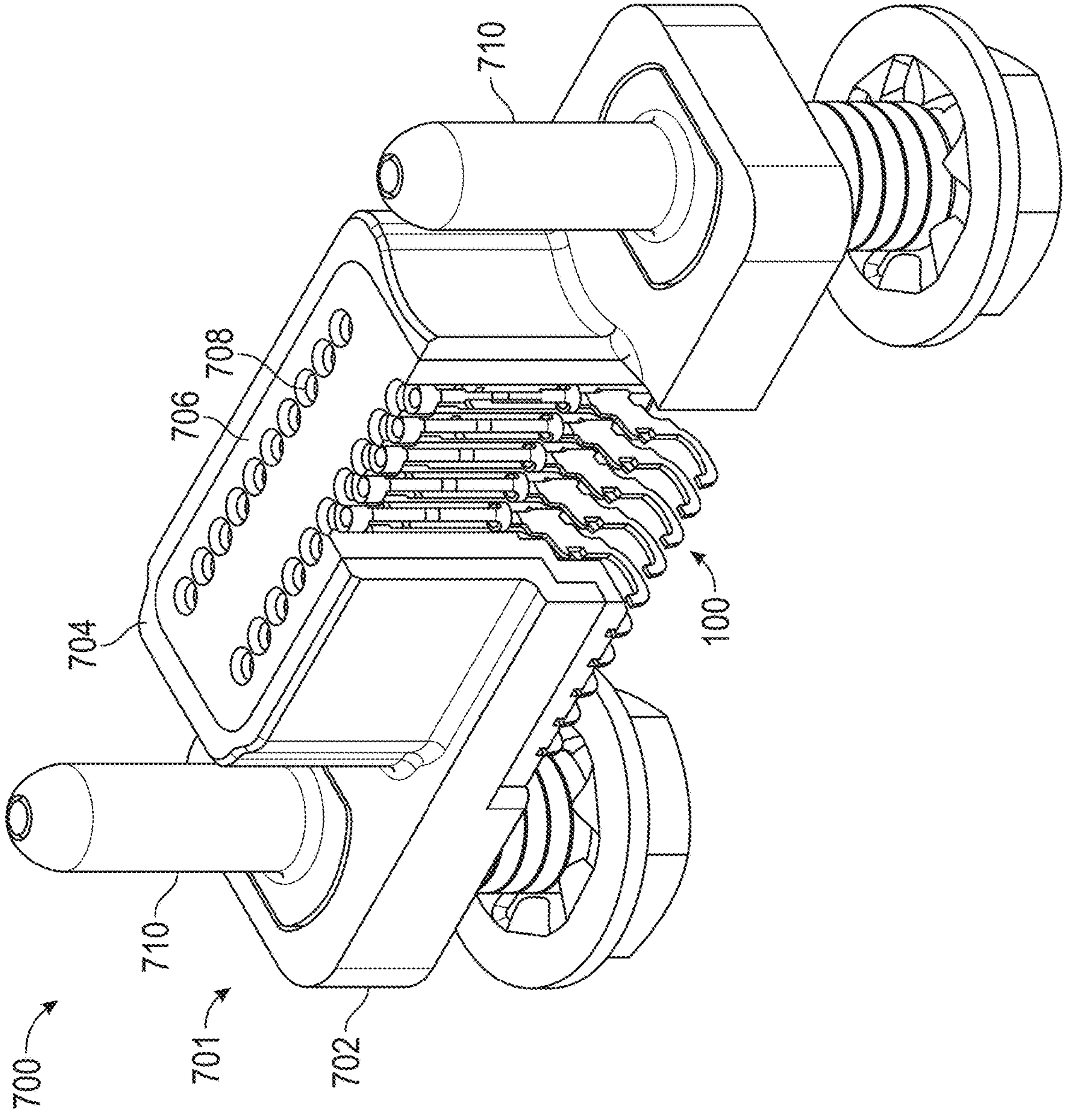
FIG. 7 is a perspective view showing an exemplary electrical connector having a plurality of exemplary sockets therein according to embodiments of the present disclosure.

Referring now to FIG. 7, a perspective view of an exemplary connector 700 is shown that uses the socket 100, 600 disclosed herein. The connector 700 in this example is a type of connector that is typically mounted to a circuit board PCB. This board-mount connector 700 is exemplary only and many other types of connectors are contemplated for use with the socket 100, 600 within the scope of the present disclosure.

As can be seen, the board-mount connector 700 is composed of a shell 701 having a generally rectangular base 702 and a generally rectangular hood 704 extending generally perpendicularly from the base 702. The protective hood 704 surrounds a female connector portion 706 having a plurality of socket passageways 708 therein. Threaded guide posts 710 protrude from the base 702 on either side of the hood 704 to facilitate connecting the board-mount connector 700 to a similar connector having a corresponding male connector portion. In accordance with embodiments of the present disclosure, a plurality of sockets 100, 600 is disposed within the socket passageways 708 of the board-mount connector 700. Such a board-mount connector 700 may then be mounted to a circuit board by soldering the sockets 100, 600 (specifically the J-style terminations thereof) to the circuit board.

Figure 8:
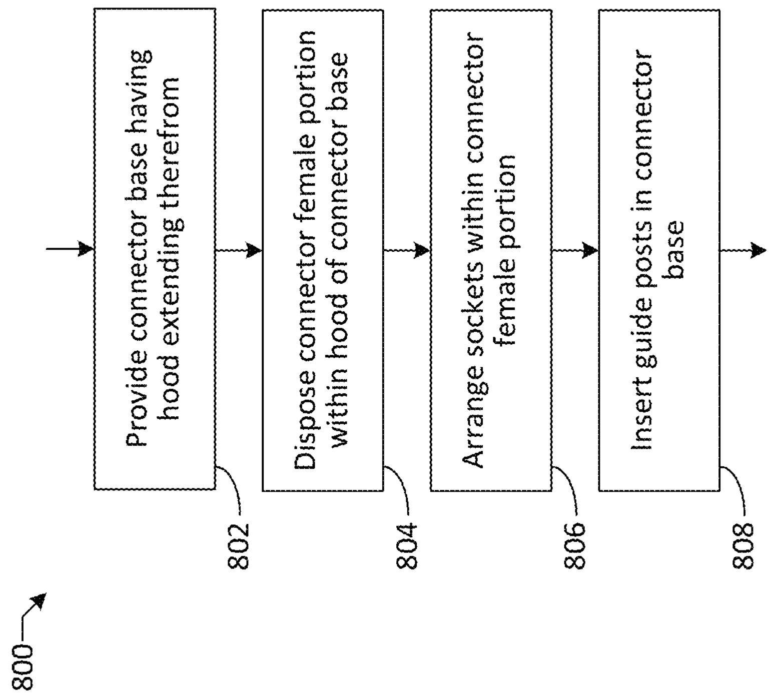
FIG. 8 is a flowchart showing an exemplary method of assembling a cable connector using the sockets according to embodiments of the present disclosure.

FIG. 8 illustrates a flowchart 800 showing an exemplary method of assembling a connector like the connector 700 herein using the sockets 100, 600 of the present disclosure. The flowchart 800 generally begins at 802, where a connector shell is provided having a generally rectangular connector base and a generally rectangular hood extending therefrom. At 804, a connector female portion is disposed within the hood, the connector female portion having a plurality of socket passageways therein. At 806, a plurality of sockets is arranged within the socket passageways, each socket configured to receive a connector lead therein via a lead insertion process. In accordance with embodiments of the present disclosure, the socket is further configured to engage the connector lead at multiple times during the lead insertion process. At 808, guide posts are inserted in the connector base adjacent to the hood on opposite sides of the connector base.

While a number of specific embodiments have been shown and described herein, it is to be understood that such embodiments are intended to be exemplary only. For example, although a socket having four and six contact members representing two and three opposing pairs of contact members, respectively, has been shown and described, those skilled in the art will understand that the socket may have a greater number of contact members within the scope hereof. Many other exemplary embodiments will become apparent upon reading and understanding the present specification and drawings. Accordingly, the specification and drawings are to be regarded as illustrative and not restrictive. The scope of the present disclosure should therefore be determined with reference to the appended claims, including the full scope of equivalents to which such claims are entitled.

We claim:

1. A socket for an electrical cable connector, the socket comprising:

a neck portion defining an opening therein for receiving a connector lead via a lead insertion process;

at least one first contact member elongating distally from the neck portion along a length of the socket and resiliently biased toward a central vertical axis of the socket;

at least one second contact member elongating distally from the neck portion along the length of the socket and resiliently biased toward the central vertical axis of the socket, the at least one second contact member having a different length compared to the at least one first contact member; wherein the neck portion is configured to receive the connector lead therein via the lead insertion process, and the at least one first contact member and the at least one second contact member engage the connector lead at different times during the lead insertion process, the at least one second contact member has a longer length compared to the at least one first contact member, and the at least one first contact member engages the connector lead before the at least one second contact member engages the connector lead.

2. The socket of claim 1, wherein the at least one first contact member and the at least one second contact member have different fundamental frequencies from one another.

3. The socket of claim 1, further comprising at least one additional contact member, each additional contact member elongating distally from the neck portion along the length of the socket and resiliently biased toward the central vertical axis of the socket.

4. The socket of claim 1, wherein the at least one first contact member is a finger contact member, the finger contact member having a lead engagement portion thereon located at a first length along the socket.

5. The socket of claim 4, wherein the at least one second contact member is a support contact member, the support contact member having a lead engagement portion thereon located at a second length along the socket.

6. The socket of claim 5, wherein the first length along the socket is different from the second length along the socket.

7. The socket of claim 1, further comprising a base portion extending from the at least one second contact member.

8. The socket of claim 7, further comprising a J-style surface mount termination extending from the base portion.

9. A connector for an electrical cable, the connector comprising:

a connector base;

a hood extending from the connector base;

a connector female portion disposed within the hood, the connector female portion having a plurality of socket passageways therein; and a plurality of sockets arranged respectively within the plurality of socket passageways, each one of the plurality of sockets configured to receive a connector lead at a first end therein via a lead insertion process, wherein each of the plurality of sockets includes a plurality of contact members arranged around a central vertical axis of the socket that extends from the first end to a second end, a first length along the central vertical axis from the first end at which a first contact member of the plurality of contact members is closest to the central vertical axis is different than a second length along the central vertical axis from the first end at which a second contact member of the plurality of contact members is closest to the central vertical axis, the first contact member is shorter than the second contact member, and the first length along the central vertical axis from the first end at which the first contact member is closest to the central vertical axis is shorter than the second length along the central vertical axis from the first end at which the other of the plurality of contact members is closest to the central vertical axis.

10. The connector of claim 9, wherein each of the plurality of sockets comprises a pair of finger contact members among the plurality of contact members, each finger contact member among the pair of finger contact members having a lead engagement portion thereon located at the first length along the central vertical axis of the socket.

11. The connector of claim 10, wherein each of the plurality of sockets further comprises a pair of support contact members among the plurality of contact members, each support contact member among the pair of support contact members having a lead engagement portion thereon located at the second length along the central vertical axis of the socket.

12. The connector of claim 11, wherein, for each of the plurality of sockets, the first length for the pair of finger contact members of the socket is different from the second length for the pair of support contact members of the socket.

13. The connector of claim 12, wherein each of the plurality of sockets further comprises a neck portion at the first end and a base portion at the second end, wherein the pair of support contact members extend between the neck portion and the base portion.

14. The connector of claim 13, wherein each of the plurality of sockets further comprises a J-style surface mount termination extending from the base portion.

15. The connector of claim 11, wherein the pair of finger contact members and the pair of support contact members have different fundamental frequencies from one another.

16. A method of assembling a connector for an electrical cable, the method comprising:

providing a connector base having a hood extending from the connector base;

disposing a connector female portion within the hood, the connector female portion having a plurality of socket passageways therein; and arranging a plurality of sockets respectively within the plurality of socket passageways, each one of the plurality of sockets configured to receive a connector lead at a first end therein via a lead insertion process, wherein each of the plurality of sockets includes a plurality of contact members arranged around a central vertical axis of the socket that extends from the first end to a second end, a first length along the central vertical axis from the first end at which a first contact member of the plurality of contact members is closest to the central vertical axis is different than a second length along the central vertical axis from the first end at which a second contact member of the plurality of contact members is closest to the central vertical axis, the first contact member is shorter than the second contact member, and the first length along the central vertical axis from the first end at which the first contact member is closest to the central vertical axis is shorter than the second length along the central vertical axis from the first end at which the other of the plurality of contact members is closest to the central vertical axis.

17. The method of claim 16, wherein arranging the plurality of sockets includes each of the plurality of sockets comprising a pair of finger contact members among the plurality of contact members, each finger contact member among the pair of finger contact members having a lead engagement portion thereon located at the first length along the central vertical axis of the socket.

18. The method of claim 17, wherein arranging the plurality of sockets includes each of the plurality of sockets comprising a pair of support contact members among the plurality of contact members, each support contact member among the pair of support contact members having a lead engagement portion thereon located at the second length along the central vertical axis of the socket.

19. The method of claim 18, wherein the first length for the pair of finger contact members of the socket is different from the second length for the pair of support contact members of the socket.

20. The method of claim 18, wherein each of the plurality of sockets further comprises a neck portion at the first end and a base portion at the second end and the pair of support contact members extend between the neck portion and the base portion.

* * * * *